United States Patent
Malina et al.

(10) Patent No.: US 12,431,162 B2
(45) Date of Patent: Sep. 30, 2025

(54) ROTATING ELECTROMAGNET FOR REMOVABLE DISK CLAMP

(71) Applicant: Western Digital Technologies, Inc., San Jose, CA (US)

(72) Inventors: Jim Malina, Irvine, CA (US); Toshiki Hirano, San Jose, CA (US); Robert P. Ryan, Mission Viejo, CA (US); Tim R. Glassburn, San Jose, CA (US); Keishi Takahashi, Fujisawa (JP)

(73) Assignee: Western Digital Technologies, Inc., San Jose, CA (US)

(*) Notice: Subject to any disclaimer, the term of this patent is extended or adjusted under 35 U.S.C. 154(b) by 85 days.

(21) Appl. No.: 18/223,452

(22) Filed: Jul. 18, 2023

(65) Prior Publication Data

US 2024/0161776 A1    May 16, 2024

Related U.S. Application Data

(60) Provisional application No. 63/425,607, filed on Nov. 15, 2022.

(51) Int. Cl.
    *G11B 5/60*      (2006.01)
    *G11B 5/48*      (2006.01)

(52) U.S. Cl.
    CPC ............ *G11B 5/6005* (2013.01); *G11B 5/486* (2013.01)

(58) Field of Classification Search
None
See application file for complete search history.

(56) References Cited

U.S. PATENT DOCUMENTS

| | | | |
|---|---|---|---|
| 4,570,194 A | 2/1986 | Schatteman | |
| 4,853,924 A | 8/1989 | Takahashi et al. | |
| 4,998,033 A | * 3/1991 | Hisabe | G11B 19/2009 310/90 |
| 5,151,837 A | * 9/1992 | Wakasugi | G11B 5/10 |
| (Continued) | | | |

FOREIGN PATENT DOCUMENTS

| | | |
|---|---|---|
| CN | 212497739 U | 2/2021 |
| JP | 2010102782 A | 5/2010 |

OTHER PUBLICATIONS

Sony Electronics Inc., Meet the family, 2 pages, downloaded from https://pro.sony/ue_US/products/optical-disc, as early as Aug. 5, 2021.

(Continued)

*Primary Examiner* — Fred Tzeng
(74) *Attorney, Agent, or Firm* — John D. Henkhaus

(57) ABSTRACT

A disk retention system includes a spindle motor assembly with a spindle motor and an electromagnet retainer coupled and rotatable therewith, and a disk media assembly including a disk medium and a ferromagnetic material coupled therewith, whereby the disk is retained on the spindle motor by an adjustable attractive magnetic force between the ferromagnetic material of the disk assembly and the electromagnet retainer of the motor assembly. The motor assembly may further include a pair of stationary electrically-conductive liquid or liquid metal slip rings and a pair of rotatable electrical contacts each electrically coupled with a respective slip ring and with the electromagnet retainer, where the slip rings may utilize a Gallium-Indium-Tin alloy.

20 Claims, 7 Drawing Sheets

(56) References Cited

U.S. PATENT DOCUMENTS

| | | | |
|---|---|---|---|
| 5,291,001 A | 3/1994 | Krayer et al. | |
| 5,412,809 A * | 5/1995 | Tam | G11B 5/553 |
| 5,485,436 A | 1/1996 | Forget et al. | |
| 5,506,458 A * | 4/1996 | Pace | H02K 1/145 |
| | | | 310/67 R |
| 5,737,150 A * | 4/1998 | Ohta | G11B 5/54 |
| 6,583,968 B1 * | 6/2003 | Scura | G11B 5/012 |
| | | | 360/99.18 |
| 6,603,632 B1 * | 8/2003 | Lee | G11B 33/1473 |
| | | | 360/97.12 |
| 6,712,618 B2 | 3/2004 | Welch | |
| 7,283,325 B2 * | 10/2007 | Fu | G11B 17/038 |
| | | | 360/99.08 |
| 7,904,918 B2 | 3/2011 | Saji et al. | |
| 8,553,518 B1 | 10/2013 | Ekhoff | |
| 11,443,775 B1 | 9/2022 | Herdendorf et al. | |
| 11,756,583 B2 * | 9/2023 | Hirano | G11B 17/028 |
| | | | 360/99.12 |
| 11,881,232 B2 * | 1/2024 | Han | G06F 1/3221 |
| 2003/0107983 A1 | 6/2003 | Kim et al. | |
| 2005/0047004 A1 * | 3/2005 | Fu | G11B 17/038 |
| | | | 360/99.12 |
| 2005/0093495 A1 * | 5/2005 | Kobayashi | G11B 19/20 |
| | | | 318/268 |
| 2006/0114603 A1 * | 6/2006 | Ser | G11B 33/148 |
| | | | 360/97.13 |
| 2007/0058292 A1 * | 3/2007 | Choi | G11B 17/0287 |
| | | | 360/99.12 |
| 2024/0161773 A1 * | 5/2024 | Tomita | G11B 25/043 |

OTHER PUBLICATIONS

Sony Electronics Inc., PetaSite Scalable Solutions, 5 pages, downloaded from https://pro.sony/ue_US/products/optical-disc/petasite-solutions, as early as Aug. 5, 2021.

Korean Intellectual Property Office (ISA/KR), PCT International Search Report and Written Opinion for International application No. PCT/US2022/028224, Sep. 23, 2022, 10 pages.

Touronen, Jouni et al., Application of GaInSn Liquid Metal Alloy Replacing Mercury in a Phase Equilibrium Cell: Vapor Pressures of Toluene, Hexylbenzene, and 2-Ethylnaphthalene, Journal of Chemical & Engineering Data, J. Chem. Eng. Data 2020, 65, 3270-3276, Received: Dec. 31, 2019 / Accepted: Apr. 13, 2020 / Published: Apr. 24, 2020, ACS Publications.

Wang, Lei et al., Electromagnetic rotation of a liquid metal sphere or pool within a solution, Proc. R. Soc. A 471: 20150177, Received: Mar. 11, 2015 / Accepted: Apr. 16, 2015, The Royal Society Publishing.

Princetel, Tutorial: Electrical Slip Rings, Last updated: Oct. 30, 2011, 5 pages, Princetel, Inc.

* cited by examiner

```
┌─────────────────────────────────────────────────────┐
│ POSITION A DISK MEDIA ASSEMBLY, COMPRISING A DISK   │
│ MEDIUM AND A FERROMAGNETIC MATERIAL COUPLED WITH    │
│ THE CENTER-HOLE OF THE DISK MEDIUM, ONTO A SPINDLE  │
│ MOTOR ASSEMBLY, COMPRISING A SPINDLE MOTOR AND AN   │
│ ELECTROMAGNET RETAINER COUPLED WITH THE SPINDLE     │
│ MOTOR                                               │
│ 602                                                 │
└─────────────────────────────────────────────────────┘
                          │
                          ▼
┌─────────────────────────────────────────────────────┐
│ APPLY CURRENT TO THE ELECTROMAGNET RETAINER TO      │
│ MAGNETICALLY HOLD THE DISK MEDIA ASSEMBLY ON A HUB  │
│ OF THE SPINDLE MOTOR ASSEMBLY VIA AN ATTRACTIVE     │
│ MAGNETIC FORCE BETWEEN THE FERROMAGNETIC MATERIAL   │
│ OF THE DISK MEDIA ASSEMBLY AND THE ELECTROMAGNET    │
│ RETAINER OF THE SPINDLE MOTOR ASSEMBLY              │
│ 604                                                 │
└─────────────────────────────────────────────────────┘
                          │
                          ▼
┌─────────────────────────────────────────────────────┐
│ REMOVE THE CURRENT TO THE ELECTROMAGNET RETAINER TO │
│ ELIMINATE THE ATTRACTIVE MAGNETIC FORCE TO ENABLE   │
│ REMOVAL OF THE DISK MEDIA ASSEMBLY FROM THE SPINDLE │
│ MOTOR ASSEMBLY                                      │
│ 606                                                 │
└─────────────────────────────────────────────────────┘
```

FIG. 6

ROTATING ELECTROMAGNET FOR REMOVABLE DISK CLAMP

FIELD OF EMBODIMENTS

Embodiments of the invention may relate generally to data storage and particularly to a rotating electromagnet for disk retention in an archival data storage library.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

There is an increasing need for archival data storage. Magnetic tape is a traditional solution for data back-up, but is notably slow in accessing the stored data. Current archives are increasingly "active" archives, meaning some level of continuing random read data access is required. In terms of magnetic media cost, magnetic disks in HDDs have the lowest demonstrated cost per terabyte (e.g., $/Tb). Furthermore, magnetic disks are known to have a relatively lengthy useful life, especially when maintained in a controlled environment, whereby the magnetic bits on the media will remain stable for a relatively long time.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 6 is a flow diagram illustrating a method for operating a disk retention system for a read-write device, according to an embodiment.

SUMMARY OF EMBODIMENT(S)

Figure 1:
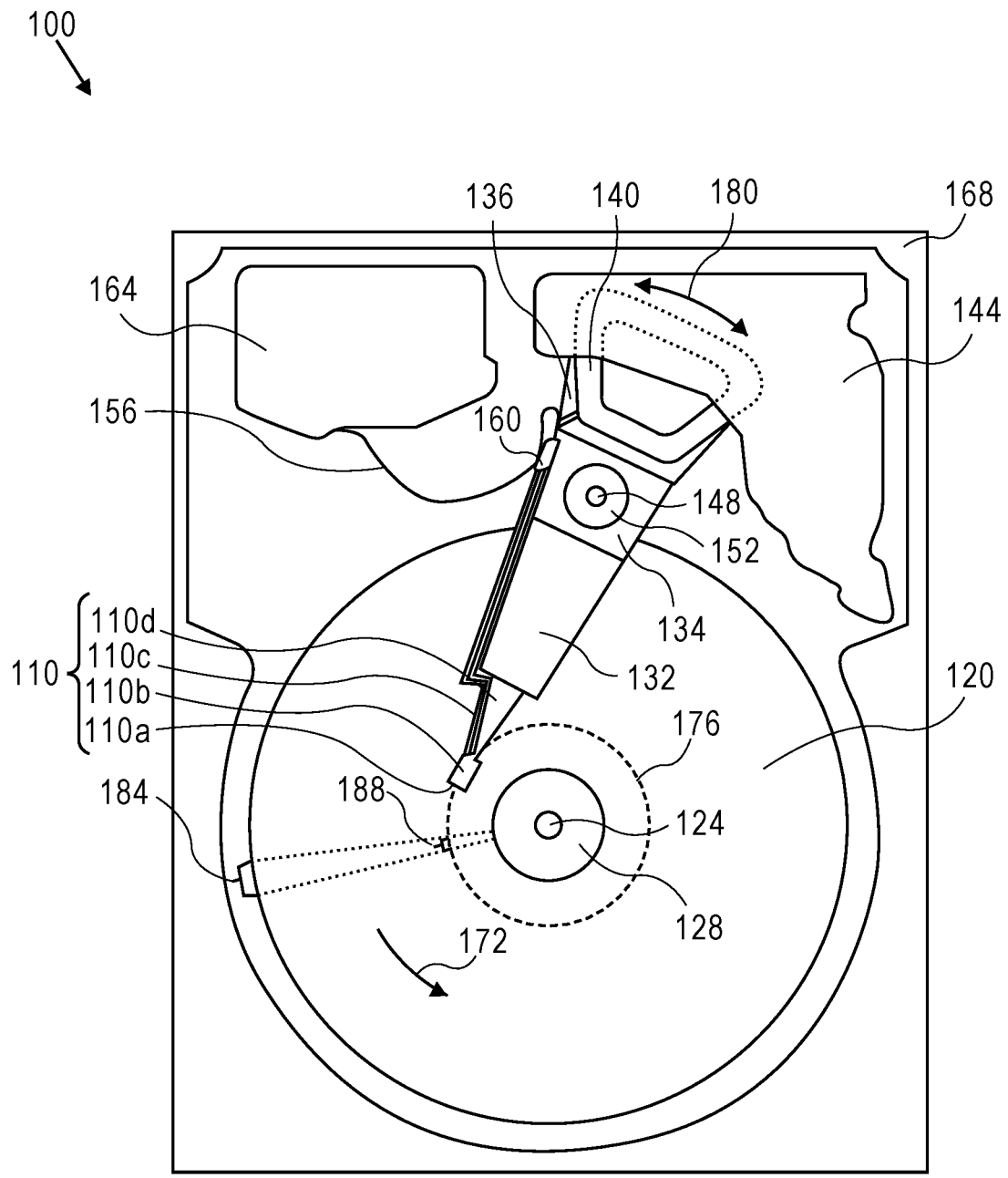
FIG. 1 is a plan view illustrating a hard disk drive (HDD), according to an embodiment.

A disk retention system includes a spindle motor assembly including a spindle motor including a hub and flange for supporting a disk medium and an electromagnet retainer coupled with the spindle motor such that the electromagnet retainer rotates with the spindle motor hub. The system further includes a disk media assembly including a disk medium and a ferromagnetic material coupled with the disk medium. The disk medium is retained on the spindle motor assembly by an adjustable magnetic force between the ferromagnetic material of the disk media assembly and the electromagnet retainer of the spindle motor assembly.

DETAILED DESCRIPTION

Generally, approaches to a magnetic disk retention system for a read-write device configured for use in a data storage library are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that there is a significant need for archival data storage, and that magnetic disks in hard disk drives (HDDs) have some advantages over other magnetic media in the context of archival (or "cold") data storage. With respect to reducing the overall cost per byte ($/Tb) of magnetic disk-based storage systems, the costs associated with the read-write head, the mechanical structures, and the electronics might be reduced. Also, increasing the number of disks per system is another way in which to further the $/Tb cost reduction goal. Therefore, a vast magnetic disk "library" containing a significantly large number of magnetic recording disks is considered an ultimate low-cost solution to the challenges associated with archival data storage both now and into the future, and one which could demonstrate a faster "time to first byte" than tape (e.g., no tape winding needed) and a faster data rate than with optical disks.

Magnetic Disk Retention System

Figure 2:
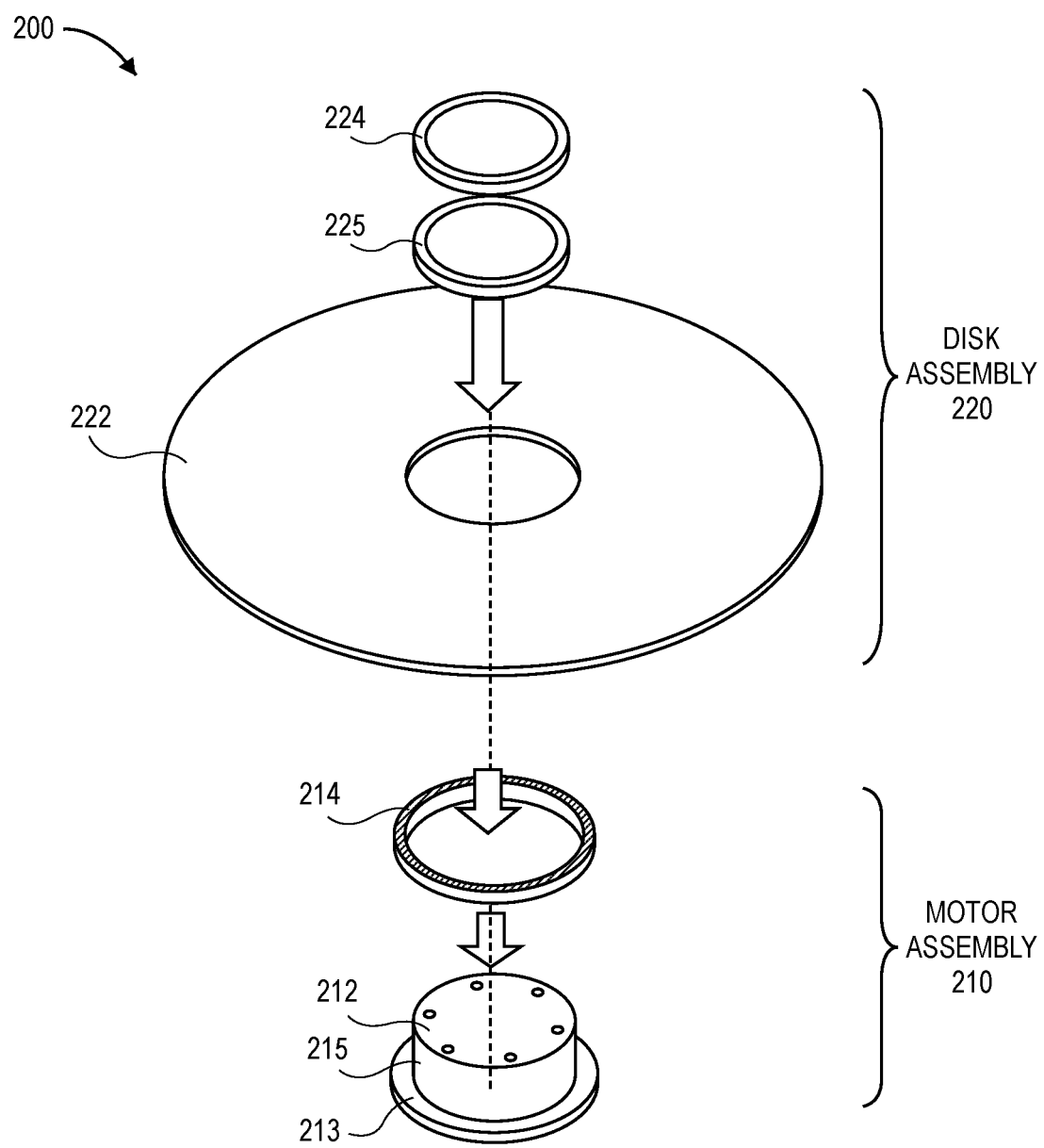
FIG. 2 is an exploded view illustrating a magnetic disk retention system, according to an embodiment.

FIG. 2 is an exploded view illustrating a magnetic disk retention system, according to an embodiment. Magnetic disk retention system 200 comprises a spindle motor assembly 210 and a disk media assembly 220.

Spindle motor assembly 210 ("motor assembly 210") comprises a spindle motor 212 including a flange 213 configured to support a disk medium and a hub 215, and an electromagnet (or "electromagnetic") retainer 214 ("retainer 214") coupled with the spindle motor 212. Applying current to one or more coils of the electromagnet retainer 214 creates a magnetic field proportional to the current applied, which supplies or generates a sufficient magnetic force to hold a disk on the spindle motor 212. The mechanical configuration of the retainer 214 may vary from implementation to implementation. For one non-limiting example, retainer 214 may be annular in form and coupled with, positioned on flange 213, such as illustrated in and described in more detail in reference to FIG. 3. For another non-limiting example, retainer 214 may be integrated directly into the flange 213 of spindle motor 212. Still further, retainer 214 could be implemented as a "top hat" configuration, whereby the electromagnet coil(s) are likened to the brim and housed on or functioning as the flange 213 with a top portion of the hat mounted on and covering or encompassing the hub 215, with the disk media assembly 220 mounted over and around that top portion and interfacing with the coil portion. In any case, at least part of the electromagnet retainer 214 is configured to rotate along with the spindle motor 212 hub during motor operation.

Disk media assembly 220 ("disk assembly 220") comprises a disk medium 222, and a ferromagnetic material 224 coupled with a center-hole of the disk medium 222. The configuration of the ferromagnetic material 224 may vary from implementation to implementation. For one non-limiting example, ferromagnetic material 224 (e.g., iron) may be configured similarly to as depicted in FIG. 2, such as embedded within or coupled to (e.g., adhered, embedded) a sleeve 225 (e.g., a plastic sleeve or washer housing) inserted (e.g., snapped, screwed, adhered) into the center-hole of disk medium 222. In any case, according to an embodiment the ferromagnetic material 224 comprises a plurality of positions of ferromagnetic material positioned annularly within the disk medium 222 center-hole. Disk retention system 200 functions as a removable recording disk retaining mechanism to "clamp" (a term typically used with conventional hard disk drives), retain, hold the disk medium 222 onto the spindle motor 212, where the disk medium 222 is retained on the flange 213 of the spindle motor assembly 210 by an adjustable or variable attractive magnetic force between the ferromagnetic material 224 of the disk media assembly 220 and the electromagnet retainer 214 of the spindle motor assembly 210, i.e., based on the varying current applied to the electromagnet retainer 214.

Figure 3:
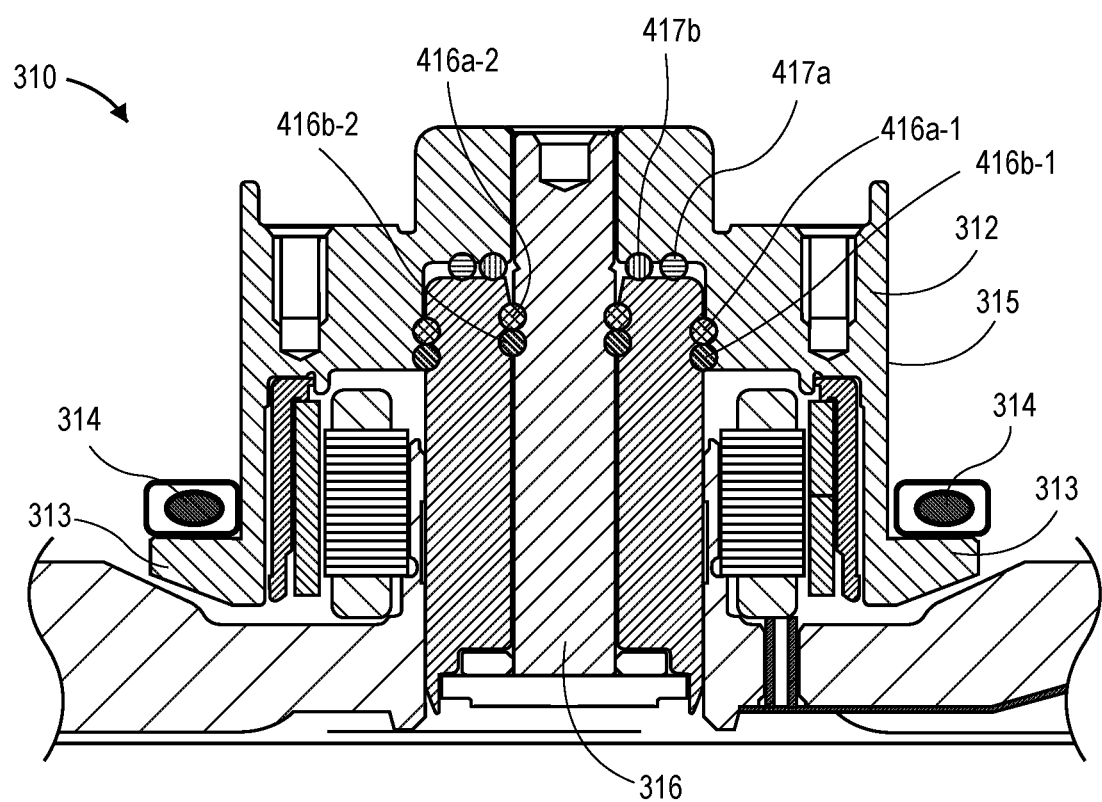
FIG. 3 is a cross-sectional side view illustrating an example spindle motor having an electromagnetic disk retainer, according to an embodiment.

FIG. 3 is a cross-sectional side view illustrating an example spindle motor having an electromagnetic disk retainer, according to an embodiment. As with spindle motor assembly 210 (FIG. 2), spindle motor assembly 310 comprises a spindle motor 312 on a rotatable shaft 316, and including a flange 313 configured to support a disk medium and a hub 315, and an electromagnetic retainer 314 ("retainer 314") coupled with the spindle motor 312. According to an embodiment, retainer 314 comprises a plurality of electromagnets (or "electromagnet coils") positioned annularly around the spindle motor 312, or more particularly around the hub of the spindle motor 312 and on the flange 313, enabling the retaining/attachment adjustable magnetic force between the ferromagnetic material 224 (FIG. 2) of the disk media assembly 220 (FIG. 2) and the spindle motor assembly 310 to retain the disk media assembly 220 on the spindle motor flange 313.

Figure 5:
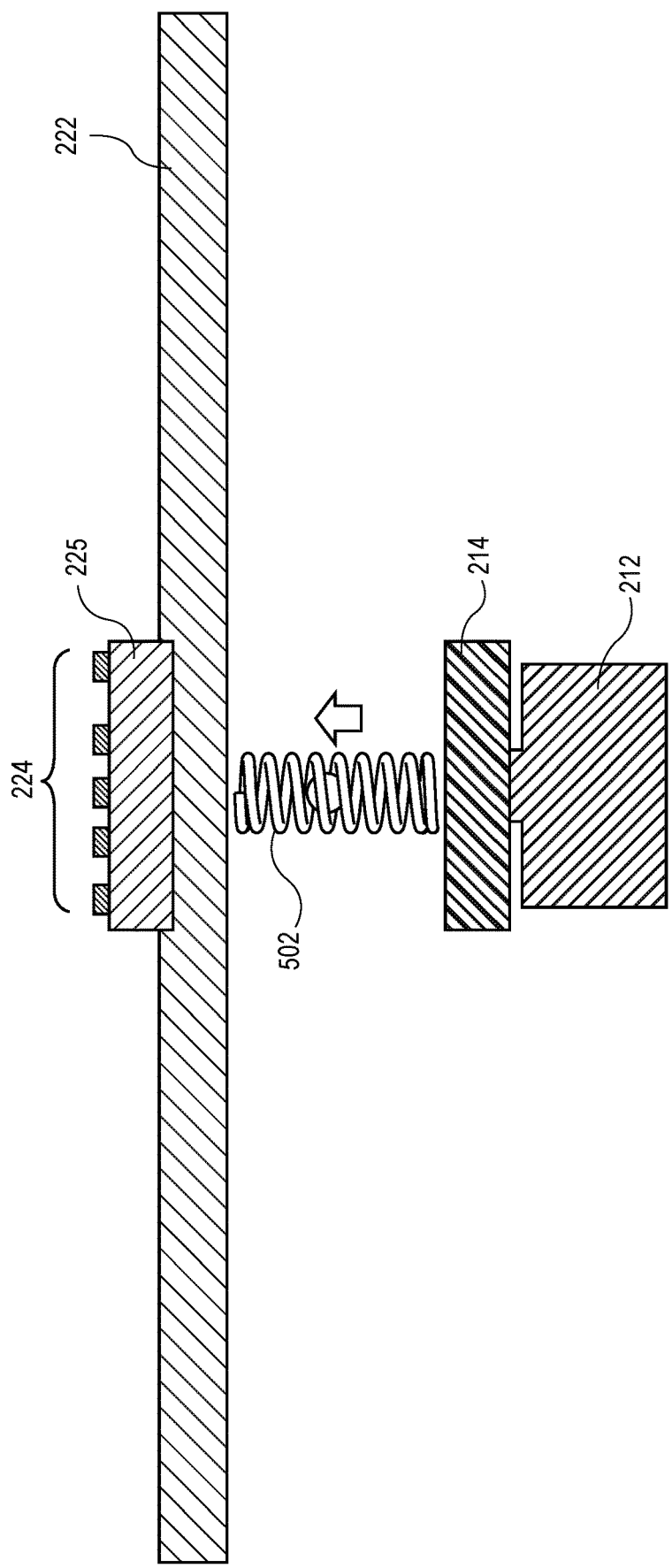
FIG. 5 is a cross-sectional side view diagram illustrating a magnetic disk retention system, according to an embodiment.

FIG. 5 is a cross-sectional side view diagram illustrating a magnetic disk retention system, according to an embodiment. Shown here is the disk medium 222 having the ferromagnetic material 224 with sleeve 225 coupled thereto (see, e.g., disk media assembly 220 of FIG. 2), and the spindle motor 212 having the electromagnet retainer 214 coupled thereto (see, e.g., spindle motor assembly 210 of FIG. 2). Additionally, according to this embodiment, the spindle motor assembly 220 further comprises a spring 502 configured to provide a separating force to the disk media assembly 210 from the spindle motor assembly 220. As such, spring 502 is compressed when the retainer 214 is energized, and provides a separating force when the retainer 214 is deenergized and the corresponding magnetic field is off.

Supplying Current to Electromagnet Retainer

As discussed, the electromagnet retainer 214, 314 is in some manner coupled with the spindle motor 212, 312. Hence, when the spindle motor 212, 312 spins/rotates during motor operation, the retainer 214, 314 likewise will spin/rotate along with the motor 212, 312. So a challenge is presented regarding providing power from non-rotating electronics to a moving, rotating mechanism such as electromagnet retainer 214, 314.

Figure 4A:
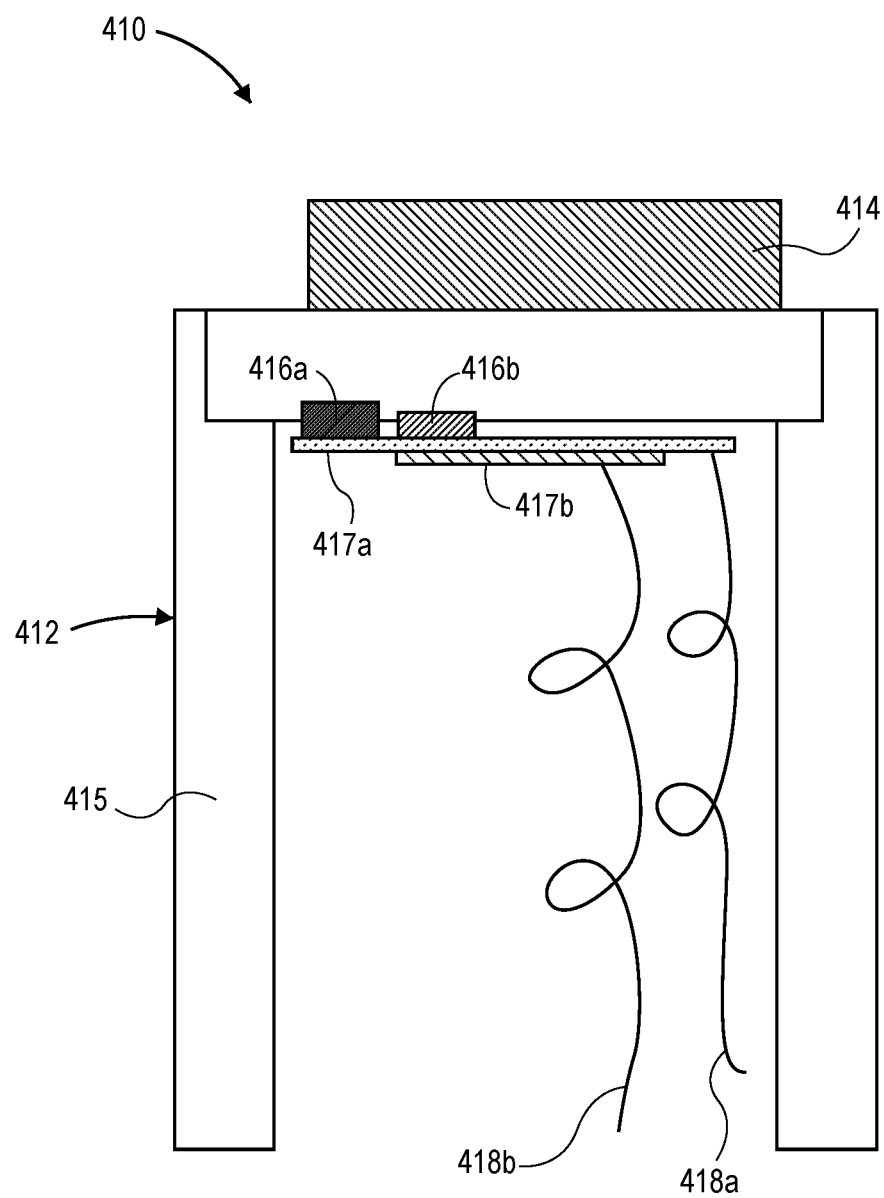
FIG. 4A is a diagrammatic cross-sectional side view illustrating a spindle motor having an electromagnetic disk retainer, according to an embodiment.
Figure 4B:
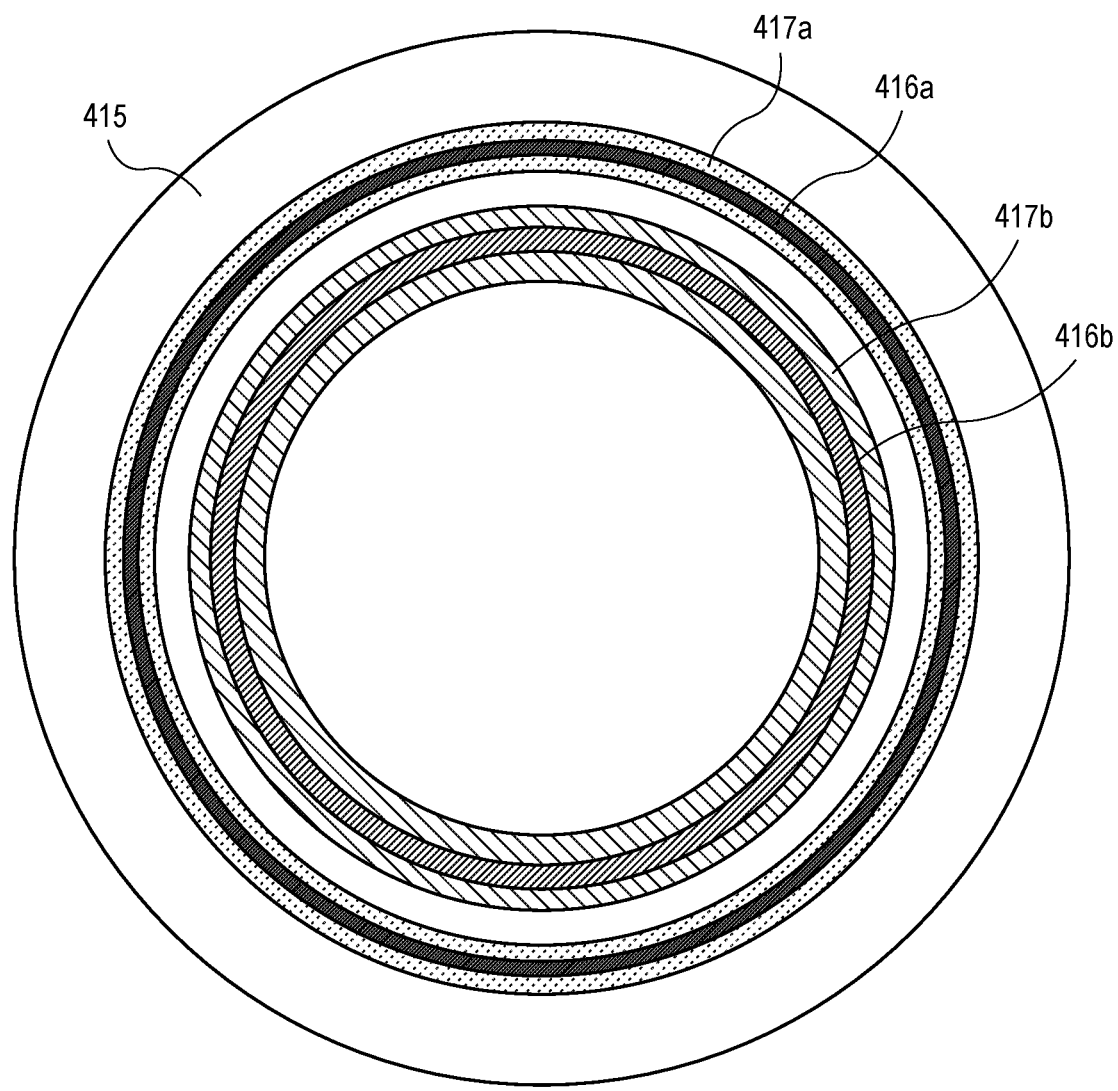
FIG. 4B is a diagrammatic top view illustrating the spindle motor of FIG. 4A, according to an embodiment.

FIG. 4A is a diagrammatic cross-sectional side view illustrating a spindle motor having an electromagnetic disk retainer, and FIG. 4B is a diagrammatic top view illustrating the spindle motor of FIG. 4A, both according to an embodiment. FIG. 4A depicts a spindle motor assembly 410 comprising a corresponding spindle motor 412, similar to or the same as spindle motor assemblies 210 (FIG. 2), 310 (FIG. 3) comprising corresponding spindle motors 212 (FIG. 2), 312 (FIG. 3). The spindle motor 412 comprises a spindle motor hub 415 ("hub 415"). Spindle motor assembly 410 further comprises a pair of electrically-conductive liquid metal slip rings 417a, 417b (see also FIG. 3) and a corresponding pair of rotatable electrical contacts 416a, 416b, each electrically coupled with a respective slip ring 417a, 417b and with an electromagnet retainer 414, similar to or the same as retainers 214 (FIG. 2), 314 (FIG. 3). A slip ring refers to an electromechanical device which enables the transmission of power and/or electrical signals between stationary and rotating members, i.e., effectively a mechanism for providing an electrical connection through a rotating assembly. A slip ring may also be referred to as a collector ring, a rotary electrical contact, and an electrical slip ring, for examples. Here, these liquid metal filled slip rings 417a, 417b provide a brushless, electrical contact for the corresponding contacts 416a, 416b, to provide an electrical connection and thus to enable electrical transmission therebetween. Use of liquid metal slip rings rather than brush contact provides enhanced motor stability and reliability, at least in part because use of a brush would add friction, which is undesirable for a high-RPM (revolutions per minute) precision motor, and because brushes degrade or wear out with use. Each slip ring 417a, 417b is electrically connected to and fed power through a corresponding non-rotating wire 418a, 418b.

While FIG. 4A depicts the electrical contacts 416a, 416b coupled with the top of the hub 415 of spindle motor 412, i.e., horizontal contacts, alternative arrangements are contemplated. For example and according to an embodiment, electrical contacts 416a, 416b may be coupled with an inner side surface (e.g., vertical) of the hub 415 (see FIG. 3 for example locations of electrical contacts 416a-1, 416b-1) rather than with an inner top surface as depicted. For example and according to another embodiment, electrical contacts 416a, 416b may be coupled with the outer surface of a rotating shaft 316 within the spindle motor 412 (see FIG. 3 for example locations of electrical contacts 416a-2, 416b-2) rather than with the hub 415. In both vertical contact cases, configuring the electrical contacts 416a, 416b on a rotating vertical structure benefits from centrifugal force to maintain electrical contact with a corresponding liquid slip ring 417a, 417b.

FIG. 4B depicts concentric slip rings 417a, 417b within the spindle motor hub 415, along with each corresponding electrical contacts 416a, 416b. Responsive to the hub 415 rotating, a non-rotating (stationary) negatively-charged (e.g., black) liquid metal channel such as slip ring 417a enables an electrical connection with corresponding rotating negative (e.g., black) electrical contact 416a to electromagnet retainer 414 (FIG. 4A), while likewise a non-rotating (stationary) positively-charged (e.g., red) liquid metal channel such as slip ring 417b enables an electrical connection with corresponding rotating positive (e.g., red) electrical contact 416b to electromagnet retainer 414. The positive and negative contacts 416b, 416a are configured to rotate in the two corresponding slip ring 417b, 417a channels to provide a wetted liquid metal electrical contact. While FIGS. 4A-4B depict the positive arrangement 416b, 417b concentrically within the negative arrangement 416a, 417a, for example, such configuration may be reversed. Furthermore, while slip rings 417a, 417b are described herein as liquid metal slip rings, other non-metal conductive liquids could be used (e.g., mercury is fairly common in slip rings). However, environmental operating specifications are a consideration when selecting a suitable conductive liquid, so that the liquid does not freeze and/or boil in the HDD operating temperature range, for example.

Utilization of a liquid metal having a suitably high viscosity should be and is chosen here, to limit the impact on the motor stability in operation. It is recognized that there are few known fluids (e.g., liquid at room temperature) that are electrically conductive and have relatively electrically low resistance. Historically, mercury has been used to achieve clean electrical signals, for both power and data, in rotary electrical contact designs. However, use of mercury in applications is prohibitive, primarily due to its toxicity. Thus, according to an embodiment the liquid metal in each slip ring 417b, 417a comprises a Gallium-Indium-Tin (GaInSb) alloy. One such alloy is referred to by the brand name Galinstan, believed to be a registered trademark of Geratherm Medical AG and composed of 68.5% Ga, 21.5% In, and 10.0% Sn (by weight). However, other suppliers of a GaInSb alloy are currently available.

Method of Operating Disk Retention System

FIG. 6 is a flow diagram illustrating a method for operating a disk retention system for a read-write device, according to an embodiment. Example uses include operating disk retention system 200 (FIG. 2) associated with, corresponding to a read-write device (e.g., a modified, modular, or deconstructed form of a conventional hard disk drive) in a data storage system such as a data storage library, data archive, rack-mountable data storage juke box, and the like.

At block 602, position a disk media assembly, comprising a disk medium and a ferromagnetic material coupled with a center-hole of the disk medium, onto a spindle motor assembly, comprising a spindle motor and an electromagnet retainer coupled with the spindle motor. For example, disk assembly 220 (FIG. 2) comprising disk medium 222 (FIG. 2) and a ferromagnetic material 224 (FIG. 2) coupled with a center-hole of the disk medium 222 is positioned by a robotic tool, or otherwise, onto motor assembly 210 (FIG. 2) comprising spindle motor 212 (FIG. 2) and electromagnet retainer 214 (FIG. 2) coupled with the spindle motor 212.

At block 604, apply current to the electromagnet retainer to magnetically hold the disk media assembly on a hub of the spindle motor assembly via an attractive adjustable, variable magnetic force between the ferromagnetic material of the disk media assembly and the electromagnet retainer of the spindle motor assembly. For example, current is applied to the electromagnet retainer 214 (FIG. 2), 314 (FIG. 3), 414 (FIG. 4A) to magnetically hold the disk assembly 220 on hub 215 (FIG. 2), 315 (FIG. 3), 415 (FIGS. 4A-4B) of the motor assembly 210 via an attractive magnetic force between the ferromagnetic material 224 and the electromagnet retainer 214, 314, 414. Further, current may be applied to the electromagnet retainer 214, 314, 414 by applying current to the pair of electrically-conductive liquid metal slip rings 417a, 417b (FIGS. 4A-4B) each electrically coupled with a corresponding electrical contact 416a, 416b (FIGS. 4A-4B) of the pair of rotatable electrical contacts positioned on the hub 215, 315, 415 of the motor assembly 210 and electrically coupled with the electromagnet retainer 214, 314, 414.

At block 606, remove the current to the electromagnet retainer to eliminate the attractive magnetic force to enable removal of the disk media assembly from the spindle motor assembly. For example, the current to electromagnet retainer 214, 314, 414 is removed (i.e., the electromagnetic coils are turned off) to eliminate the attractive magnetic force to enable removal of the disk assembly 220 from the motor assembly 210.

Thus, the method of FIG. 6 enables installing, mounting disk media assembly 220 (FIG. 2) onto (e.g., for data storage operational capability within a read-write device) and removing, unmounting disk media assembly 220 from spindle motor assembly 210 (e.g., for disk exchange capability such as within a data storage library, archive, "juke box"). The foregoing approaches which utilize an electromagnet coupled with the spindle motor eliminate a need for more costly permanent magnet(s), where the electromagnetic retainer 214 (FIG. 2), 314 (FIG. 3), 414 (FIG. 4A) is capable of being energized and deenergized thereby reducing the force required for separation of the disk media assembly 220 from the spindle motor assembly 210 (e.g., zero force may be desirable when handling removable disks that are written with data) relative to use of permanent magnet(s). Furthermore, in the embodiment of FIG. 5 in which a spring 502 is positioned between the disk assembly 220 from the motor assembly 210, the force required to remove the disk assembly 220 from the motor assembly 210 is reduced. Still further, the electromagnetic force provided via retainer 214, 314, 414 is programable (e.g., variable) and, therefore, adjustable and can be applied gently and gradually, thereby reducing stresses and torques during disk mount and unmount.

Physical Description of an Illustrative Operating Context

Embodiments may be implemented in the context of digital data storage devices (DSDs) such as hard disk drive (HDDs) or modified HDDs (e.g., a read-write device). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable", or "flexible printed circuit" (FPC)). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A disk retention system comprising:
   a spindle motor assembly comprising:
      a spindle motor including a hub and a flange for supporting a disk medium, and
      an electromagnet retainer coupled with the spindle motor such that the electromagnet retainer rotates with the spindle motor hub; and
   a disk media assembly comprising:
      a disk medium, and
      a ferromagnetic material coupled with the disk medium;
   wherein the disk medium is retained on the spindle motor assembly by an adjustable magnetic force between the ferromagnetic material of the disk media assembly and the electromagnet retainer of the spindle motor assembly.

2. The disk retention system of claim 1, the spindle motor assembly further comprising:
   a pair of electrically-conductive liquid slip rings; and
   a pair of rotatable electrical contacts each electrically coupled with a respective slip ring and with the electromagnet retainer.

3. The disk retention system of claim 2, wherein the slip rings comprise a GaInSn (Gallium-Indium-Tin) metal alloy in liquid form.

4. The disk retention system of claim 2, wherein the electrical contacts are configured on the spindle motor hub.

5. The disk retention system of claim 2, the spindle motor assembly further comprising a rotating shaft; and
   wherein the electrical contacts are configured on the shaft.

6. The disk retention system of claim 1, the spindle motor assembly further comprising a spring configured to provide a separating force to the disk media assembly.

7. The disk retention system of claim 1, wherein the electromagnet retainer is positioned around the hub and on the flange of the spindle motor.

8. A magnetic read-write device comprising the disk retention system of claim 1.

9. A method of operating a disk retention system for a read-write device, the method comprising:
   positioning a disk media assembly, the disk media assembly comprising a disk medium and a ferromagnetic material coupled with a center-hole of the disk medium, onto a spindle motor assembly, the spindle motor assembly comprising a spindle motor and an electromagnet retainer coupled with the spindle motor; and
   applying current to the electromagnet retainer to magnetically hold the disk media assembly on a hub of the spindle motor assembly via an adjustable attractive magnetic force between the ferromagnetic material of the disk media assembly and the electromagnet retainer of the spindle motor assembly.

10. The method of claim 9, further comprising:
   removing the current to the electromagnet retainer to eliminate the attractive magnetic force to enable removal of the disk media assembly from the spindle motor assembly.

11. The method of claim 9, wherein applying current to the electromagnet retainer includes applying current to a pair of electrically-conductive liquid slip rings, each slip ring electrically coupled with a corresponding electrical contact of a pair of rotatable electrical contacts electrically coupled with the electromagnet retainer.

12. The method of claim 11, wherein the slip rings comprise a liquid metal comprising a GaInSn (Gallium-Indium-Tin) alloy.

13. The method of claim 11, wherein the electrical contacts are configured on the hub of the spindle motor assembly.

14. The method of claim 11, wherein:
   the spindle motor assembly further comprises a rotatable shaft that rotates during operation of the spindle motor; and
   the electrical contacts are configured on the rotatable shaft.

15. The method of claim 9, wherein the spindle motor assembly further comprises a spring configured to provide a separating force between the disk media assembly and the spindle motor assembly.

16. A disk media system for a read-write device, the system comprising:
- a spindle motor assembly comprising:
  - a spindle motor including a hub and a flange for supporting a disk medium, and
  - adjustable first magnetic means for retaining, coupled with the spindle motor, such that at least part of the first magnetic means for retaining is configured to rotate with the spindle motor hub; and
- a disk media assembly comprising:
  - a disk medium, and
  - second magnetic means for retaining coupled with the disk medium;
- wherein the first and second magnetic means for retaining cooperate to enable retention of the disk media assembly on the spindle motor assembly.

17. The system of claim 16:
wherein the first magnetic means for retaining further operates to enable removal of the disk media assembly from the spindle motor assembly.

18. The system of claim 17, wherein the spindle motor assembly further comprises a separating means configured to provide a separating force to further enable removal of the disk media assembly from the spindle motor assembly.

19. The system of claim 16, wherein the first magnetic means for retaining comprises a stationary pair of electrically-conductive means and corresponding rotatable pair of electrical contacts each electrically coupled with a respective one of the pair of electrically-conductive means.

20. The system of claim 19, wherein the electrically-conductive means includes a liquid metal comprising a GaInSn (Gallium-Indium-Tin) alloy.

* * * * *